S. R. DWIGGINS & L. E. KELLEY.
SPRING WHEEL.
APPLICATION FILED JUNE 15, 1912.

1,063,784.

Patented June 3, 1913.

Witnesses

Inventors
S. R. Dwiggins
L. E. Kelley
by
Attorneys

UNITED STATES PATENT OFFICE.

SAM R. DWIGGINS AND LAWRENCE E. KELLEY, OF LEONARD, TEXAS.

SPRING-WHEEL.

1,063,784.   Specification of Letters Patent.   Patented June 3, 1913.

Application filed June 15, 1912. Serial No. 703,968.

*To all whom it may concern:*

Be it known that we, SAM R. DWIGGINS and LAWRENCE E. KELLEY, citizens of the United States, residing at Leonard, in the county of Fannin, State of Texas, have invented a new and useful Spring-Wheel, of which the following is a specification.

One object of the present invention is to provide a novel form of tire in which the commonly employed pneumatic elements may be dispensed with, all danger of puncture being thereby avoided.

A further object of the invention is to provide a novel arrangement of springs, affording a resilient support for the tread.

The invention aims further to provide a novel form of tread, and to equip the tread with elements which will serve, at once, as a means for reinforcing the tread and as a place of attachment for the springs.

The invention aims further to provide a device of the type above mentioned, in which the tread-carried members for securing the springs are so disposed and shaped as to protect the springs and to afford proper yielding movement in the tread.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
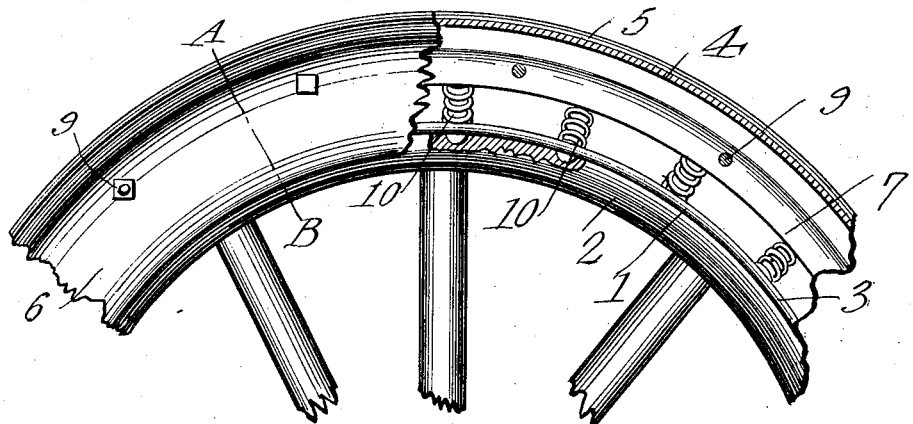
Figure 2:
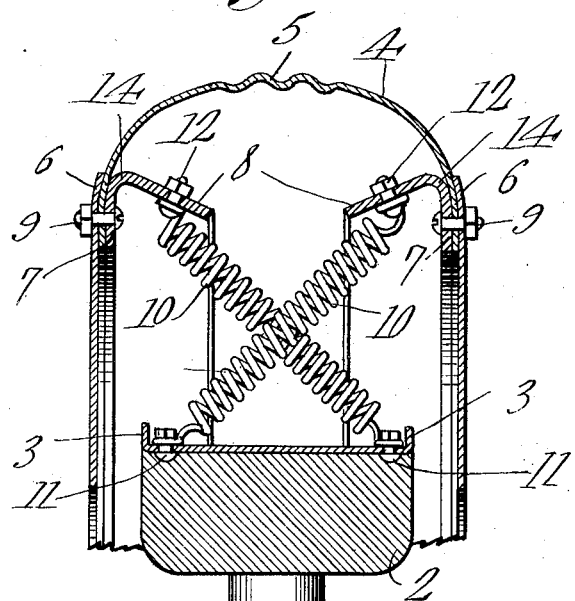

In the drawings,—Figure 1 shows in fragmental side elevation, a wheel equipped with the device constituting the subject-matter of this application; and Fig. 2 is a section on the line A—B of Fig. 1.

The wheel herein disclosed comprises, broadly considered, three constituent parts; a rim; a tire; and resilient means for spacing the rim from the tire.

The rim preferably takes the form of a band 1, adapted to be mounted upon the felly 2, the band 1 being provided along its edges with projecting flanges 3.

The tire is a composite structure and comprises an arched, resilient tread 4, preferably fashioned from metal and provided along its longitudinal center with corrugations 5, adapted to prevent skidding. To the outer faces of the tread 4, annular side plates 6 are applied the side plates 6 extending inwardly so as to overlap the felly 2. To the inner faces of the tread 4, angle members are applied, each angle member including a flange 7 which abuts against the tread 4, and a flange 8 which overhangs the rim 1. The flanges 8 slant toward the median plane of the wheel and toward the rim 1. Securing elements 9, preferably taking the form of bolt and nut structures, extend through the flanges 7 of the angle members, through the edges of the tread 4, and through the side plates 6. The angle members and the tread 4 are fashioned in any desired number of sections, circumferentially of the wheel.

The invention further includes springs 10, sloping in opposite directions, transversely of the wheel, and alternating in their direction of extent. By means of attaching elements, such as bolt and nut structures 11, the inner ends of the springs 10 are secured to the rim 1, similar attaching elements 12 being employed for connecting the outer ends of the springs 10 with the flanges 8 of the angle members. The springs 10 are compression springs. The attaching elements 12 are so placed upon the flanges 8 that the apices 14 of the angle members project beyond the members 12. Consequently, when the tread 4 is flattened down, the tread will not be injured by contact with the members 12. It is to be observed that the flanges 8 overhang the outer ends of the springs 10, and consequently the springs are protected. Further, since the flanges 8 slant toward the median plane of the wheel and toward the rim 1, a maximum opportunity is afforded for the compression of the tread 4 in the median plane of the wheel. The springs 10 preferably lie at an acute angle to the rim 1, and as a consequence, the springs will exert a maximum effort to resist lateral movement in the tread 4.

Having thus described the invention, what is claimed is:—

1. In a device of the class described, a rim; an arched tread; spaced angle members, each having a flange secured to the tread and a flange overhanging the rim; and springs connected with the last specified flanges of the angle members and with the rim, said flanges overhanging the springs and being interposed between the springs and the tread, whereby when the tread is flattened, said flanges will protect the springs against contact with the tread.

2. In a device of the class described, a rim; an arched tread; spaced angle members, each having a flange secured to the tread and a flange overhanging the rim; and springs secured to the rim and to the overhanging flanges, the overhanging flanges slanting toward the median plane of the rim to permit a depression of the tread adjacent its median plane and upon both sides thereof, independently of the overhanging flanges.

3. In a device of the class described, a rim; an arched tread; spaced angle members, each having a flange secured to the tread and a flange overhanging the rim; springs secured to the rim; and devices securing the springs to the overhanging flanges, the overhanging flanges slanting toward the rim, whereby the apices of the angle members will project beyond the securing devices and prevent the tread from coming into contact with the securing devices when the tread is depressed and flexed across the apices of the angle members.

In testimony that we claim the foregoing as our own, we have hereto affixed our signatures in the presence of two witnesses.

SAM R. DWIGGINS.
LAWRENCE E. KELLEY.

Witnesses:
G. W. HILL,
M. G. DAVIS.